United States Patent [19]

Robin

[11] 4,216,821
[45] Aug. 12, 1980

[54] PUMP/HEAT EXCHANGER

[75] Inventor: Marcel Robin, Sevres, France

[73] Assignee: Commissariat a l'Energie Atomique, Paris, France

[21] Appl. No.: 870,867

[22] Filed: Jan. 20, 1978

[30] Foreign Application Priority Data

Feb. 4, 1977 [FR] France .................... 77 03192

[51] Int. Cl.² .................................. F28F 11/00
[52] U.S. Cl. .......................... 165/11 R; 73/40.5 R; 73/40.7; 165/70
[58] Field of Search .......... 165/11, 70; 73/40, 40.5 R, 73/40.7; 176/19 R, 26

[56] References Cited

U.S. PATENT DOCUMENTS

| 3,090,433 | 6/1965 | Amorosi et al. | 165/11 |
| 3,670,810 | 6/1972 | Allen | 165/70 |

FOREIGN PATENT DOCUMENTS

| 650788 | 10/1962 | Canada | 165/11 |
| 2407366 | 9/1974 | Fed. Rep. of Germany | 165/70 |

Primary Examiner—Albert W. Davis, Jr.
Assistant Examiner—Margaret A. Focarino
Attorney, Agent, or Firm—Cameron, Kerkam, Sutton, Stowell & Stowell

[57] ABSTRACT

A pump/heat exchanger assembly has tubes with double walls, inner and outer respectively, the outer wall being provided with inner longitudinal grooves. The exchange occurs between a primary fluid circulating outside the said tubes and a secondary fluid circulating inside the said tubes. A plurality of the double-walled tubes are arranged in an annular space, each tube consisting of a plurality of interconnected tube sections, having horizontal curved portions and elbowed portions, the tube sections being joined together at the elbowed portions. At least one leakproof annular chamber is provided outside the annular space and connected thereto. Leaks in the said tubes, are detected by injecting an inert gas, under a given pressure, into the said annular chambers, and comparing the pressure of the gas in the chamber with a maximum and a minimum pressure.

17 Claims, 12 Drawing Figures

PUMP/HEAT EXCHANGER

The present invention relates to an exchanger/pump assembly comprising a heat exchanger having double-walled tubes and a pump for the circulation of the primary exchange fluid which is integral with this exchanger, the said exchanger also providing a means of checking any leakage through the walls of the exchange tubes.

More precisely, the invention relates to a heat exchanger between two heat-carrying fluids, the primary and secondary fluids, respectively, which is capable of acting on the exchange apparatus, should there be any fault in this apparatus, before the two fluids come into contact. This relates particularly, but not exclusively, to cases where the two fluids react chemically with each other to produce a destructive reaction. It will be appreciated that, in this case, special precautions must be taken. The apparatus to which the invention relates also deals with the integration of the pump in the heat exchanger.

This problem arises particularly, but not exclusively, in cooling circuits for fast neutron reactors which are cooled by liquid sodium or alloys of this metal and in the energy production plant carrying out the controlled fusion of light atoms and lithium as fluid for evacuating the calories. To make the problem easier to understand, the attached FIG. 1 shows a diagram illustrating the circulation of liquids in a conventional reactor cooled by liquid sodium. It shows the tank A of the reactor in which the ore is located, a primary sodium circuit B essentially comprising an intermediate exchanger C and a pump D, both of which may be integral with the tank A, a secondary circuit E, also of sodium, essentially comprising the intermediate exchanger C and a sodium pump F and a heat exchanger G or steam generator and finally a water circuit H in which water circulates in liquid or vapour form to supply the turbine I of the electrical energy production plant. Of course, this circuit also comprises a condenser J and a feed pump K together with various water reheaters (not shown).

It will thus be seen that the cooling and heat-transporting circuit contains an intermediate exchanger in which the primary sodium circulates, on the one hand, and the so-called secondary sodium circulates, on the other hand; the primary sodium is radioactive and liable to be contaminated by fission and corrosion products when it passes through the core of the reactor inside the core tank, whereas the secondary sodium is not radioactive. There is also a second heat exchanger or steam generator G in which both the secondary sodium and water circulate. Of course, it is known that, if there is any leakage in the tubes of the exchanger G, thus bringing the water in contact with the sodium, a very powerful chemical reaction will occur, producing hydrogen, which will be liable to form an explosive mixture with oxygen and thus jeopardize part of the plant, unless adequate protective measures have been taken. It will be obvious that it is important that the sodium/water exchanger should be very reliable and have detection means in the case of accidental fracture of the tubes.

It will be seen, from the preceding description, that a loop of "clean" sodium is inserted in a circuit of this kind, between the possibly contaminated radioactive sodium and the water circuit. The presence of this loop of secondary sodium substantially adds to the cost of the plant in that, on the one hand, it increases the dimensions of the confining enclosure in which the plant is located and, on the other hand, it too contains expensive components.

One way of substantially reducing the cost of this part of the plant consists in doing away with the exchanger between the primary sodium and secondary sodium. It will be seen that one then has an exchanger which operates directly between the primary sodium and the water. Naturally, it is essential to use a very reliable exchanger.

Exchangers having double-walled tubes are known. An inert gas is made to circulate between the two walls of the tubes and this simultaneously serves to detect any leaks in the tubes.

However, if it is desired to use small diameter tubes (of the order of 20 mm) whilst ensuring that the vapour is superheated, these tubes have to be very long. This implies that each tube must be made by welding several double-walled tube sections together end to end. It is clear that these welds constitute serious weak points in the unity of the exchange tubes.

The present invention relates precisely to an exchanger with double-walled tubes consisting of several tube sections, which permits checking of the joining welds and enables them to be placed in a medium not consisting of the primary fluid.

Moreover, the integration of the primary pump inside this exchanger results in a substantial reduction in the construction costs of the plant, partly by dispensing with large diameter connecting lines, in particular, and the outer casings of the different parts of the plant, and partly by substantially reducing the volume of the confining enclosure for the nuclear plant.

It is obvious that an exchanger assembly of this kind would be most suitable in cases where the secondary sodium circuit is used, thus increasing its reliability.

The exchanger/pump assembly with double-walled tubes, inner and outer respectively, between a primary fluid circulating outside the said tubes and a secondary fluid circulating inside the said tubes, is characterised in that it comprises:

an outer casing with a vertical axis, provided with a base, a lid and an inlet nozzle for the primary fluid arranged below the said lid;

a collar inside the said casing and coaxial therewith and integral at its upper end with the stopper, the said collar defining a central vertical channel and an annular space between the said casing and the said collar, this collar defining between itself and the base a passage which communicates between the said central channel and the said annular space;

a plurality of the said double-walled tubes arranged in the said annular space, each tube consisting of a plurality of interconnected tube sections, the said tube sections being in the form of convolutions having horizontal curved portions and elbowed portions, the tube sections being joined together at the elbowed portions: at least one leakproof annular chamber outside the said annular space and connected thereto, a pump fixed to the said lid and fitted with a rotor, the said pump being located at the upper end of the said central channel and adapted to draw in the said primary fluid, means of detecting leaks in the said tubes, comprising means to inject an inert gas into the or one of the said annular chambers, under a given pressure, and means for comparing the pressure of the said gas in the or one of the said chambers with a maximum and a minimum pressure; the tube sections are connected in the annular chamber or chambers, the end of the outer wall of one section and the start of the outer wall of the next section open into the said chamber, the end of the inner wall of one tube section is joined in leakproof manner to the start of the inner wall of the next section by an elbowed duct.

According to a first embodiment, there are n−1 annular connecting chambers (if each tube comprises n tube sections) and one annular inlet chamber and one annular outlet chamber for the secondary fluid. All these annular chambers are joined to the outer casing of the pump/exchanger assembly and the portions of the casing to which they are joined constitute a tube plate for the outer walls of the tube sections (connecting chambers) or tubes (inlet and outlet chambers). The annular inlet and outlet chambers are associated with an inlet and outlet collector, respectively, for the secondary fluid. The wall common to the chamber and the collector constitutes a tube plate for the inlet and outlet ends, respectively, of the inner walls of the tubes.

According to a second embodiment wherein each tube comprises n tube sections, there is a single annular chamber which simultaneously serves as the connecting chambers, inlet and outlet chamber. This chamber is defined by the inner collar which, in this case, comprises two coaxial walls. These are interconnected at their lower end and are separately joined to the lid at their upper end. The inlet and outlet collectors for the secondary fluid are fixed to the portion of the lid limited by the connecting circles of the walls of the inner collar to the lid.

According to this second embodiment, either the outlet duct for the primary fluid is arranged on an extension of the central channel above the pump, or the outlet duct is coaxial with the central channel and passes through the base of the outer casing.

In any case, the invention will be better understood from the following description of five embodiments of the invention which are given as nonrestrictive examples. The description refers to the accompanying drawings, wherein:

FIG. 1, which has already been described, shows a plan of the circulation of the fluids, with a double loop of sodium, according to the prior art;

Three embodiments of the pump/exchanger assembly will now be described, comprising convoluted tubes, i.e. wherein a tube is made up of several tube sections joined together, the connecting zones jutting out from the casing of the exchanger.

Figure 1:
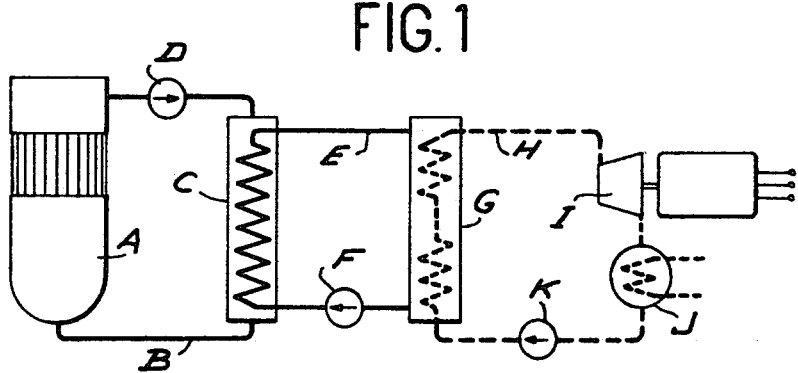
Figure 2A:
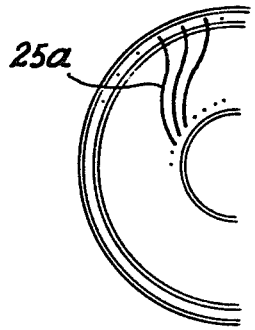
FIG. 2a shows a view from above this variant of the embodiment, showing the tubes as involutes of a circle.
Figure 2:
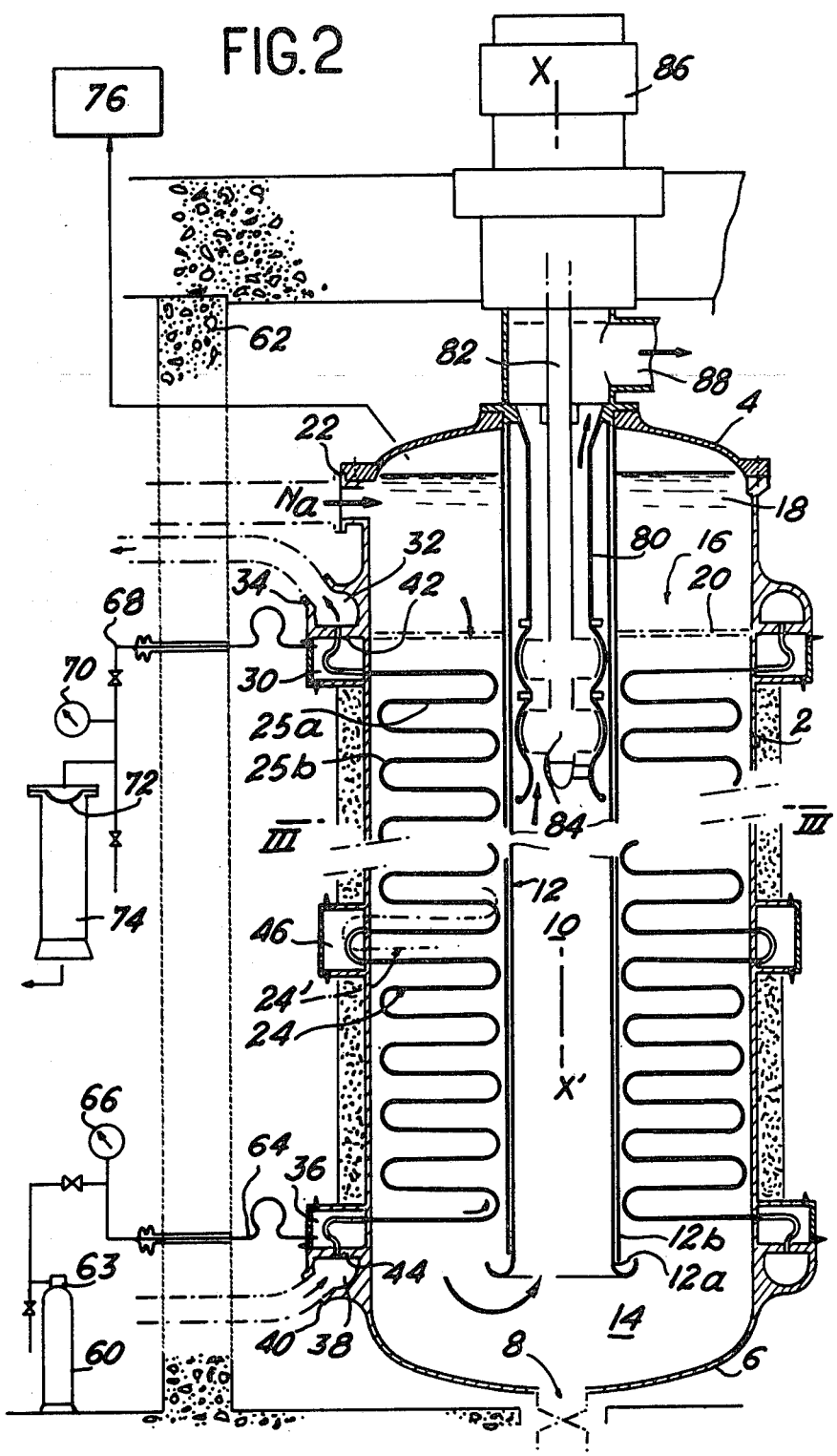
FIG. 2 shows a vertical section through a first embodiment of the pump/exchanger assembly, with tubes in the form of convolutions, connected to the inside of the outer casing.

FIG. 2 shows a vertical section through a first embodiment of the heat exchanger according to the invention. First of all, the pump/exchanger assembly comprises an outer casing 2 of generally cylindrical form closed off at its upper end by a lid 4 and at its lower end by a base 6 fitted with an emptying device 8. Inside the casing 2 and along its vertical axis XX', there is a central channel 10 limited by a cylindrical collar 12 with double walls 12a and 12b which terminates above the base 6 of the casing to leave a passage 14, whilst this collar passes through the lid 4 at its upper end. As will be seen later, the rotor of the integral pump and its intake orifice are located inside this central channel. The outer casing 2 and the central collar 12 define between them an annular space having reference numeral 16. The upper part of this annular space 16 constitutes a settling chamber 18 limited at its lower end by a distribution plate 20 perforated by a plurality of holes. A supply nozzle 22 for sodium opens into this settling chamber 18. Below the distribution plate 20 are exchange tubes with the reference numeral 24, each of convoluted shape. More precisely, this means that each tube 24 is made up of a plurality of horizontal tube portions 25a parallel to one another and joined together at their ends by tubes bent round in a semicircle 25b. These tubes take up the entire annular space 16 below the distribution plate 20 and above the lower edge of the collar 12 and form a bundle which is supported and guided by vertical tie rods of flat iron which are integral with at least one support fixed to the wall 12a of the collar 12. Referring to FIG. 2a which is a partial horizontal section through the exchanger in FIG. 2, it will be seen that each tube of convoluted form is therefore arranged in one layer and is, in fact, in the form of an involute of a circle. More precisely, the portions 25a of the tubes are in the form of an involute of a circle prolonged by arcs of circle, said circle having a center and radii such that one of the extremities of said arc is tangentially connected with said involute of circle, the other extremity being perpendicular to the outer casing. The fact that the tube portions 25a are curved in the form of involutes of a circle has two advantages: first, this makes it possible to fill the annular space 16 to an optimum degree; secondly, this shape satisfies the condition that a curved element is washed by a quantity of sodium in proportion to its length.

Moreover, in order to ease certain problems of welding which will be described hereinafter, two consecutive layers of tubes are offset by half the distance between two adjacent tube portions. A section of offset tubes is shown by means of broken lines of various kinds at 24'. At their upper end, the tubes 24 pass perpendicularly through the outer casing 2 and pass through an upper annular chamber 30 which is outside the casing 2, under conditions which will be defined hereinafter. Above this upper annular chamber 30 there is an annular outlet collector for vapour 32 which is arranged above the annular chamber 30, and the upper end of the tubes 24 opens into this collector 32. The collector is provided with a connecting nozzle 34 connected to the vapour outlet. At their lower ends, the tubes 24 pass through a second, lower annular chamber 36 arranged outside the casing 2 and open, under conditions which will be specified hereinafter, into an annular inlet collector for water 38 located immediately below the annular chamber 36. This collector 38 comprises at least one water inlet nozzle 40. Thus, it will be understood that the thick wall 42 separating the annular chamber 30 from the outlet collector 32 constitutes an outlet tube plate and that, in the same way, the thick wall 44 separating the inlet collector 38 from the lower annular chamber 36 constitutes the inlet tube plate. Finally, it should be pointed out that, at the connections between two tube sections, these tube sections project out of the annular space 16 and are connected, by means of an elbow portion, on the inside of an intermediate annular chamber 46 outside the casing 2, this connection being made under conditions which will be specified hereinafter.

Naturally, the number of intermediate chambers 46 depends on the number of tube sections required to make up a complete tube. More precisely, if a tube consists of n tube sections there are n-1 intermediate annular chambers 46.

As has already been stated, the tubes 24 have double walls, i.e. these tubes actually have an outer wall 24a and an inner wall 24b. Longitudinal channels such as 24c are provided in the outer wall 24a, these channels going from one end of a tube section to the other. More precisely, the water circulates inside the inner wall 24b, the sodium circulates outside the outer wall 24a and, as will be explained later, there is pressurized helium in the grooves 24c.

Figure 2B:
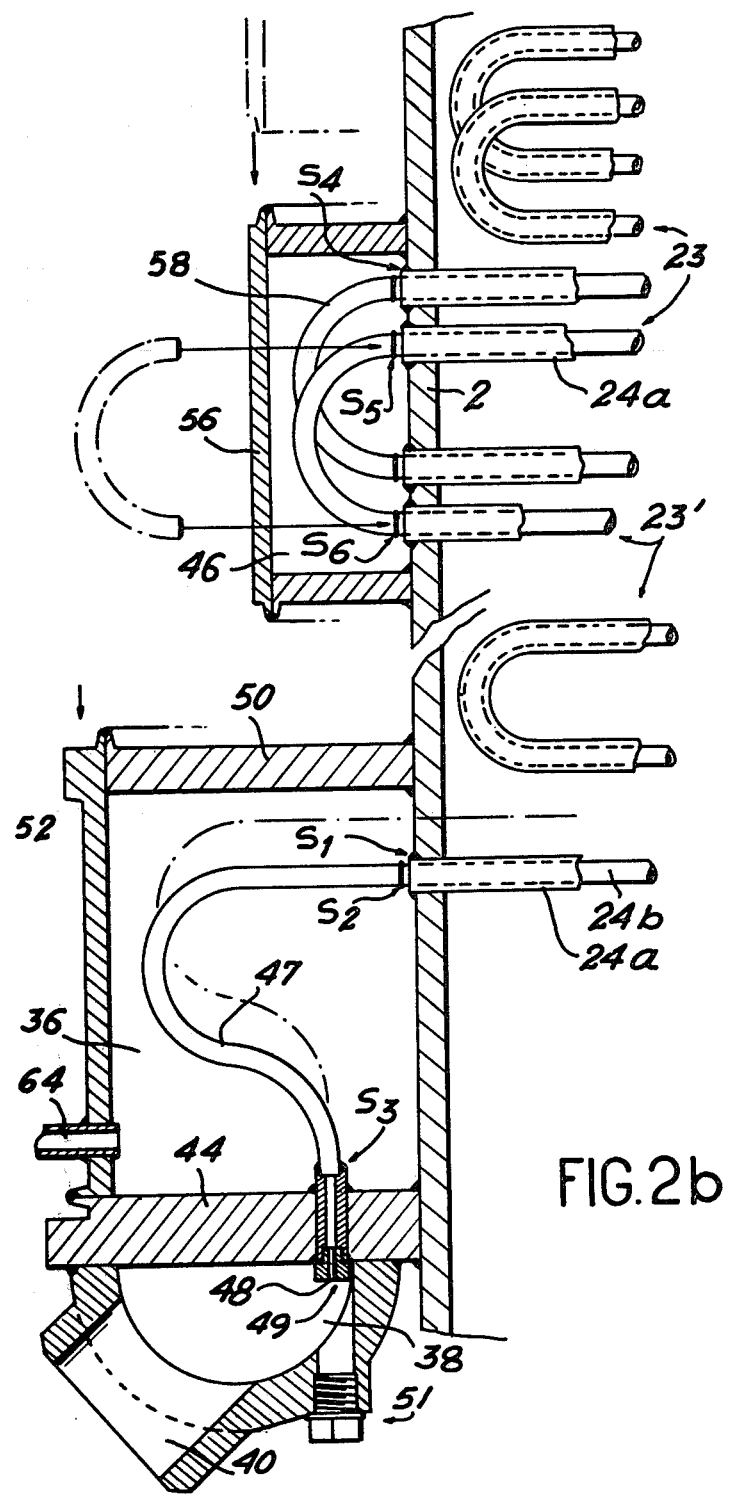
FIG. 2b shows a detailed view of part of FIG. 2, showing the interconnection of the tube sections and the connection of the tubes to the inlet collector for the water.
Figure 2C:
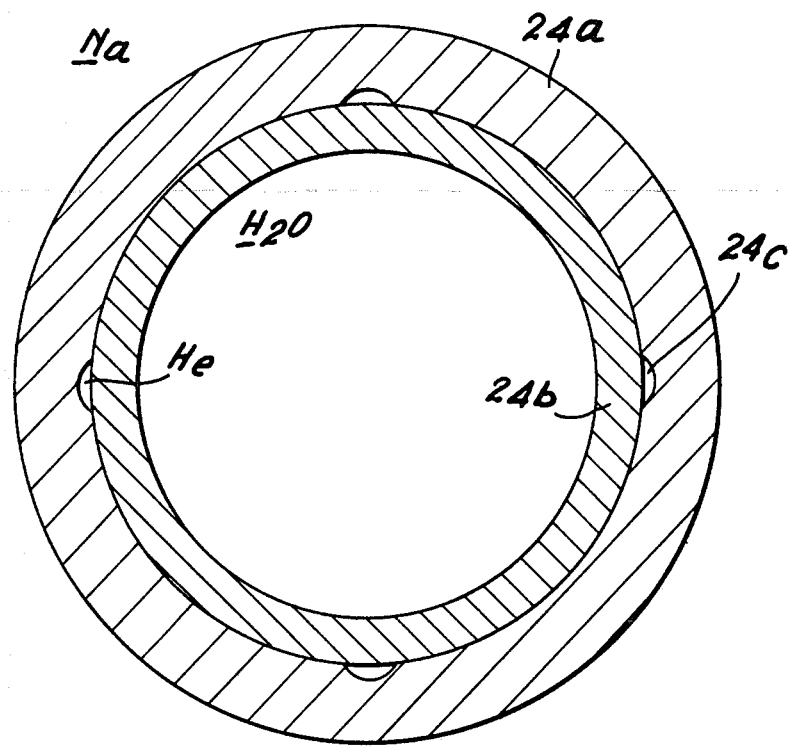
FIG. 2c shows a cross section through a double-walled exchange tube.
Figure 2D:
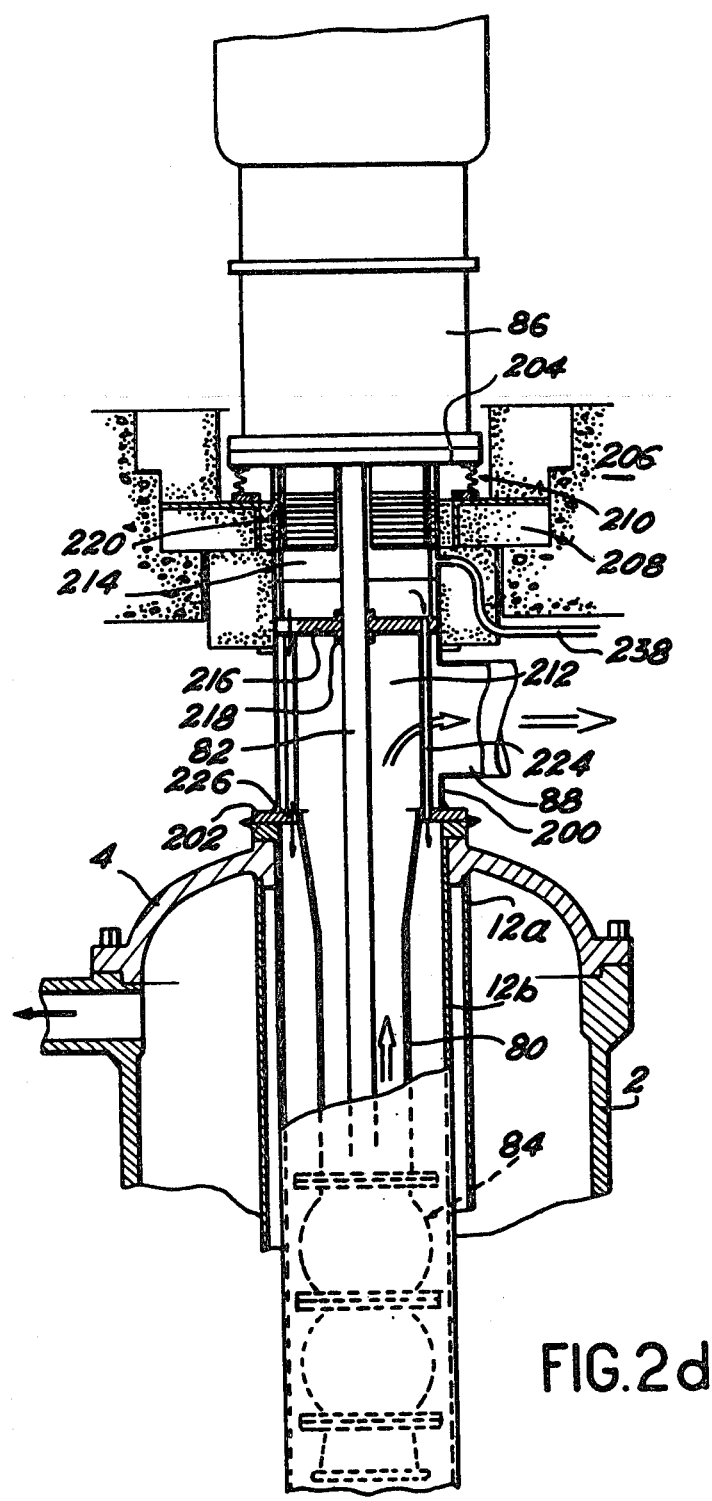
FIGS. 2d to 2g show views of the mounting of the pump on the exchanger shown in FIG. 2.
Figure 2E:
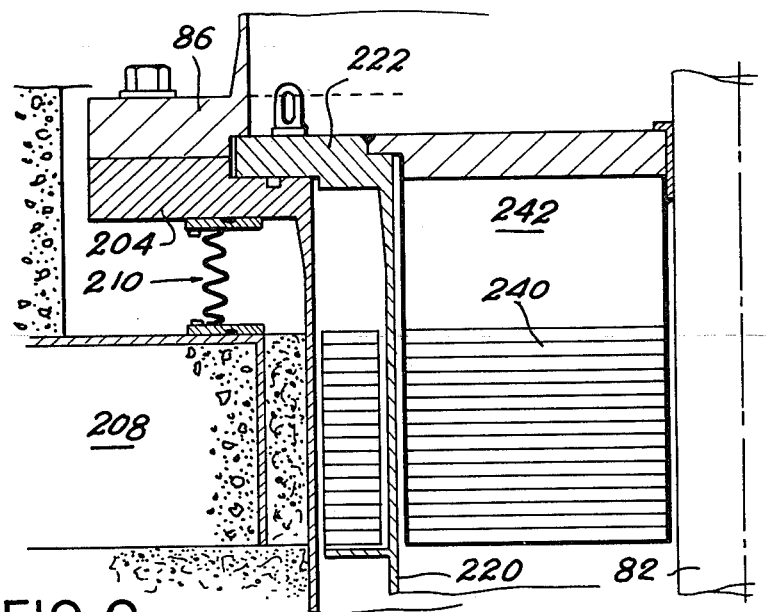
Figure 2F:
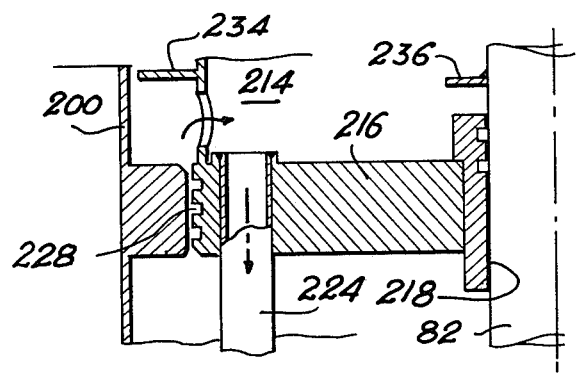
Figure 2G:
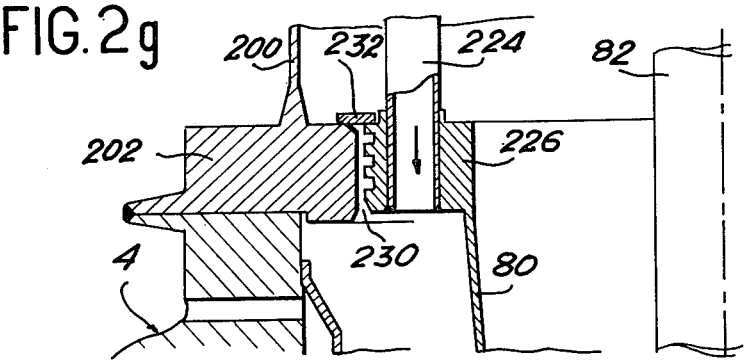

The lower part of FIG. 2b shows the manner in which the tubes 24 are connected to the water inlet collector. The tube 24 or, more accurately, its outer wall 24a, passes through the casing 2 of the exchanger (which thus acts as a first tube plate) and terminates substantially at the outer surface of this wall 2. The grooves 24c therefore open into the annular chamber 36. The outer wall 24a is welded to the casing 2 by a weld S1. The inner wall 24b projects slightly from the outer wall 24a inside the annular chamber 36 and is welded to one end of an expansion tube 47 arranged inside the annular chamber 36 (weld S2). At its other end, the expansion tube 47 is welded to the tube plate 44 (weld S3) at a passage hole 48 provided with a flow stabilising diaphragm 49 which can be reached through the access hole 51 made in the wall of the collector 38 and fitted with a removable stopper. In fact, the annular chamber 36 has a lower wall which is formed by the tube plate 44, an upper annular wall 50 and a lateral wall 52. This lateral wall 52 is welded to the upper and lower walls 44 and 50. Thus, it will be understood that the welds S1, S2 and S3 for all the tubes 24 are made first, then the wall 52 of the annular chamber is put into position and welded.

In the upper part of this same FIG. 2b, the connection between two tube sections 24 is shown. By way of example, an upper section is designated 23 and a lower section 23'. As has already been mentioned, this connection is made outside the casing 2 and inside an annular chamber bearing reference numeral 46. The outer walls 24a of the tubes 24 pass through the casing 2 perpendicularly and project slightly beyond this wall to which they are welded (weld S4). The inner walls 24b are slightly prolonged inside the intermediate annular chamber 46 and are connected to tubes in the form of semicircles such as 58. More precisely, one end of the tube 58 is welded (weld S5) to the end of the inner wall 24b of the section 23, whilst the other end is welded to the inner wall 24b of the tube section 23' (weld S6). In fact, the annular chamber 46 has a lateral wall 56 which is welded on later. Consequently, before this lateral wall is put into position, it is easy to perform the welds S4, S5 and S6. It will also be easy to check them without having to get inside the casing 2.

It will readily be understood that the upper, lower and intermediate annular chambers, 30, 36 and 46 respectively, have exactly the same function. They are all projections out of the annular space 16. They are leak-proof and the grooves 24c open into these chambers.

On the other hand, conduits prolonging the inner wall of the double-walled tubes pass through these chambers in sealed manner.

As has already been pointed out, one of the advantages of the invention is that it enables one to detect any leakage of sodium or water before these two liquids come into contact. For this, helium under a certain pressure or, more generally, an inert gas under this same pressure, is injected into the longitudinal grooves 24c.

Referring again to FIG. 2, the helium circuit which permits detection of any leak in the double-walled tubes 24 will now be described. The helium is obtained, for example, from a canister of compressed helium 60 placed outside the concreted enclosure 62 containing the pump/heat exchanger assembly itself. This canister contains helium at 196 bar, for example, and a pressure reducer 63 enabling this helium to be brought down to a pressure of the order of 10 bar (a level between the vapour pressure in the secondary circuit and the pressure of the sodium in the primary circuit). The pressure reducer 63 is connected to the annular chamber 36 by flexible tubing 64 which passes through the concrete wall 62 in leaktight manner and which comprises a manometer 66 with a maximum contact and minimum contact. The outlet of this helium circuit is formed by the flexible tubing 68 connected to the annular chamber 30 which passes through the concrete wall 62 in leaktight manner and which is connected to a maximum and minimum pressure detector 70 and a safety membrane 72 extended by discharge piping 74.

The helium circuit is therefore as follows: starting from the pressurised helium canister 60, the helium passes into the annular chamber 36, follows the longitudinal grooves in the tubes 24c, fills the annular chambers 46 and finally enters the annular chamber 30 from which it flows out again through the conduit 68 comprising the manometer 70 and comes in contact with the membrane 72.

The method of operation of this helium circuit for detecting leaks is as follows: before introducing sodium into the generator, which is preheated to about 425° K., the pressure reducer 63 of the helium canister 60 is opened and the inner circuit is flushed out. After waiting for the manometer 66 to indicate the minimum pressure chosen, for example 6 bar, and after closing the pressure reducer, the pressure shown is read off. If the pressure continues to be equal to at least the minimum pressure selected, the helium circuit is pronounced sound and the steam generator is then filled with sodium. Normally, the helium pressure should increase as a result of the rise in temperature, since the sodium entering the generator is at over 425° K. When the generator is progressively brought up to its rated power, the average temperature of the sodium in the apparatus and hence that of the helium increase to reach an average value of the order of 750° K., in normal operation, and the manometer then indicates a pressure of the order of 10 bar. Starting from this value, the position of the maximum contact of the manometer 70 is fixed, this value being about 2 bar greater than the value of 10 bar, so that the effect of a slight increase in the temperature of the sodium relative to the rated value can be tolerated without triggering the detection system.

Depending on its size, a leak in the water-vapour system, and hence a leak in an inner tube 24a, will cause the helium pressure to increase more or less rapidly, since the pressure of this water is much higher than the normal pressure of the helium. This helium pressure then exceeds the maximum pressure registered on the manometer 70. The operator is thus alerted and can reduce the power of the station suitably and order the defective steam generator to be put out of commission. If the leakage of steam were very substantial, for example in the case of total fracture of an elbow in one of the helium chambers (tubes 58), the increase in pressure would cause breakage of the safety membrane 72 and the steam escaping from the leak would be discharged into the outer atmosphere at a second maximum level higher then the first. It should be noted that the helium circuit is protected from excess overpressure and also that the outer tubes of the double wall cannot be subjected to unacceptable internal pressure by a leak in an inner tube. For safety's sake, the latter can be designed to resist the rated pressure of the steam, i.e. about 185 bar in the examples found today in this type of plant.

A leak in the outer wall 24a of the double wall is shown up by a fall in the helium pressure in its circuit and the inoffensive entry of helium into the sodium circuit. In fact, the sodium is at a significantly lower pressure than the minimum pressure shown on the manometer 70. The operator will become aware of a leak when the pressure on the manometer 70 falls below the minimum pressure shown, on the one hand, and also, thanks to suitable apparatus 76 (a simplified mass spectrometer, for example), the fact that the argon atmosphere above the sodium is rich in helium will be noticed. These concomitant signals would confirm the existence of a leak in the outer tube 24a. If this leak is slight and does not affect the reactivity of the reactor, it is possible to wait for a programmed drop in power of the reactor before intervening.

Calculations carried out, on the assumption that the walls 24a and 24b have the same resistance, have shown that the probability of a leak appearing in the inner tubes 24b and outer tubes 24a simultaneously is of the order of $2 \times 10^{-9}$, during the life of the reactor, for a boiler with a power of the order of 1200 to 1800 MW of electricity and designed to function for a maximum of 200,000 hours. It will be seen that this probability is extremely slight, and indeed, in practice, it means that the event would never happen. Obviously, the helium could be replaced by another inert gas.

Up till now, the exchanger part of the assembly to which the invention relates has been described, and referring first of all to FIG. 2, for the pump part, it comprises basically a skirt 80 which penetrates inside the axial channel 10 and surrounds the shaft 82 of the pump together with its rotor or rotors 84. The shaft is driven by the motor of the pump, diagrammatically shown at 86, which, being located outside the concrete enclosure, is supported by the upper part of the casing of the pump/exchanger assembly. The discharging of the sodium after it has passed into the rotors 84 is effected via the tubing 88 located outside the casing 2. The circulation of the sodium is easily understood from the preceding description. It is introduced through the supply nozzles 22, passes through the settling chamber 18 and through the holes in the distribution plate 20, goes down into the annular space 16 along the tubes 24 and rises again through the central channel 10 to go through the pump and finally leave through the conduit 88. As for the circulation of the water, this is as follows: the water is injected through one or more nozzles 40 in the annular inlet collector 38, then follows the tubes 24, or, more accurately, the inner tubes 24a, it stores calories during its circulation in these tubes and comes out again in the form of steam and enters the annular outlet collector 32 from where it passes into the outlet conduit connected to the nozzle 34.

FIGS. 2d, 2e, 2f and 2g show details of the installation of the pump part of the exchanger/pump assembly, and, in particular, the existing leakproofing systems.

The pump body 200 is provided, at its lower end, with a flange 202 fixed to the lid 4 of the enclosure 2. This pump body comprises the outlet tubing 88 for the sodium and, in its upper part, a flange 204 for connection to the motor assembly of the pump having the general reference numeral 86. The pump 200 passes through the biological protection block 206 via a plug 208. The tight fit between the plug 208 and the pump body 200 is obtained using the sealing bellows/210 fixed to both the plug and the flange 204.

The pump body 200 is divided up into a high pressure lower chamber 212 and a low pressure higher chamber 214 by a horizontal plate 216 which is, of course, located above the outlet tubing 88. This plate 216 is provided in its centre with a bore 218 for the shaft 82 of the pump. The fit between the shaft and the plate is semi-tight.

This plate 216 is supported by a perforated collar 220 which is fixed to the said plate at its lower end and provided, at its upper end, with a flange 222 which rests on the flange 204 and is made integral with the latter.

The skirt 80 of the pump is supported in the following way: support tubes such as 224 arranged in a cylindrical layer about the axis of the pump are fixed to the plate 216 at their upper ends and pass through the said plate. At their lower ends, they are fixed to a flange 226 located at the upper end of the skirt 80 and they pass through this flange 226. Thus, the tubes join the low pressure chamber 214 to the space contained between the collar 12b and the skirt 80. A semi-tight fit is obtained between the plate 216 and the pump body 200 by means of a labyrinth 228 provided on the periphery of this plate. Similarly, a labyrinth 230 is provided on the periphery of the flange 226, which is completed with a cover plate 232. Finally, deflectors 234 and 236 provided in the low pressure chamber 214 on the collar 220 and on the shaft 82 facilitate the return of any leakage. The low pressure chamber 214 contains an argon covering layer supplied via the conduit 238.

Finally, biological and thermal protection is ensured by a radiological screen 240 and a thermal screen 242 located in the upper part of the low pressure chamber 214.

The operational details of the pump, resulting from its integration with the steam generator, are obvious from the preceding description. The primary flux of sodium compressed by the stage or stages 84 passes from the skirt 80 in the high pressure chamber 212 which it leaves via the conduit 88. A small amount of seepage may pass into the low pressure chamber 214. This seepage returns to the inlet of the pump as a result of the support tubes 224.

The cylindrical layer of support tubes 224 may, of course, be replaced by a single tube of suitable diameter coaxial with the shaft 82 and connected to the supporting flange 226 by means of perforated centering means.

A second embodiment of this pump/exchanger assembly, shown in FIG. 3, will now be described; this embodiment permits a certain degree of dismantling of the bundles of exchange tubes 24 for repair or inspection purposes.

In this embodiment, the outer cylindrical casing 2 provided with its base 8 and closed off at its upper end by a removable lid 4' fixed to the lateral enclosure by a fixing flange 100 is again used. In this embodiment, the axial channel 10' is defined by a double-walled cylindrical collar, these walls being designated 102, for the external wall and 104 for the internal wall. These two walls are connected at their lower part by a half-torus. The outer wall 102 of the collar is made integral with the lid 4' at its upper end. The inner wall 104 of the collar is also made integral with the lid by a protected and guided expansion joint or bellows. Thus, the bellows prolong the central channel 10'.

In this embodiment, the annular space 110 defined by the two walls 102 and 104 of the cylindrical collar actually fulfills the function of the annular chambers 36, 46 and 30 in the previous embodiment. Consequently, the different tube sections 24 are joined together in the annular space 110 as was described with regard to the connecting of the tubes 24 in the annular chamber 46. Exactly the same welds are used.

Figure 3A:
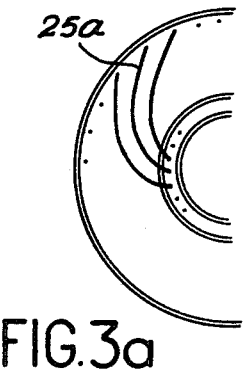
FIG. 3a shows a view from above, illustrating the form of the tubes in the second embodiment as involutes of circles.
Figure 3:
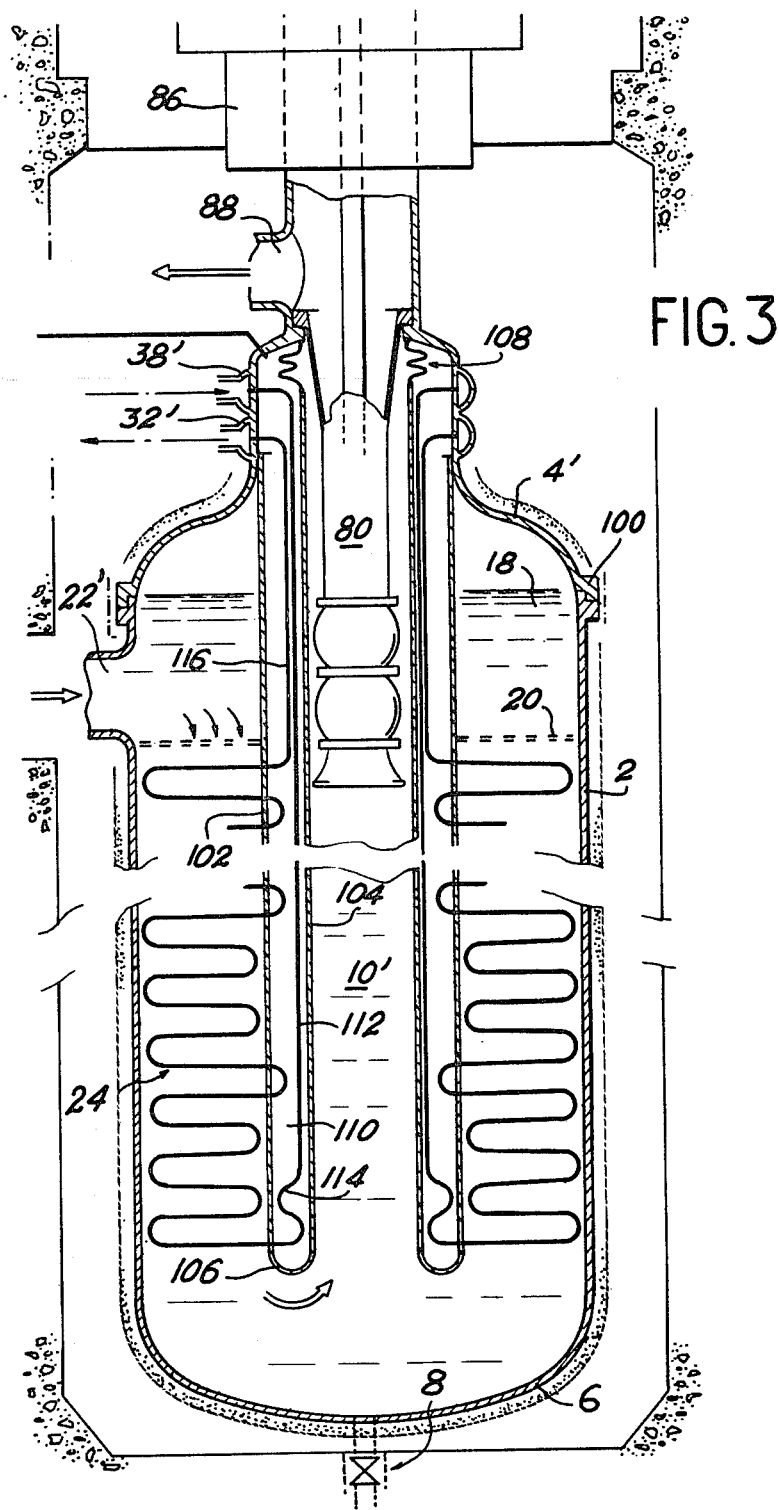
FIG. 3 shows a vertical section through a second embodiment of the pump/exchanger assembly with convoluted tubes joined to the inside of the double-walled axial channel.

More precisely, the function of the tube plate, which was fulfilled by the portions of the casing 2 to which the annular chambers 30, 36 and 46 are attached in FIG. 2, is fulfilled by portions of the outer wall 102 of the central collar in FIG. 3.

The lower end of a tube 24 is connected to the annular inlet collector 38' by a conduit 112 inside the annular space 110. To permit thermal expansion, this conduit 112 is fitted with an expansion loop 114. Similarly, the other end of a tube 24 is connected to a conduit 116 which is itself connected to the annular outlet collector 32'. The welds between the inner tubes 24b and the conduits 112, 114 and 116, as well as the connections between these conduits and the annular collectors 32' and 38' are identical to those which were described in connection with FIG. 2 and are also in a helium atmosphere.

More precisely, the portions of the lid 4' to which the collectors 32' and 38' are fixed have the same function of acting as tube plates as the plates 42 and 44 in FIG. 2.

Inside the casing 2 there are also the distribution plate 20 and, above this plate, the settling space or chamber 18 with its inlet nozzle 22' fulfilling the same function as the inlet nozzle 22. As for the pump 80 and the emptying device 8, they have the same structure as those shown in FIG. 2 and operate in the same way.

It will be understood that this arrangement makes it possible to remove all the tubes 24 together with the double walled collar 102, 104, after the pump 80 has been taken out. However, it is clear that, in order to remove the lid 4' with this collar, it is necessary to cut the outlet tubing 88 for the sodium and the connecting pipes to the annular collectors 32' and 38'.

Otherwise the assembly of the pump is identical to that shown in FIGS. 2d to 2g.

FIG. 3a shows that the entire horizontal portion of the tubes has the shape of an arc of an involute of a circle, this arc being perpendicular to the cylindrical collar 102.

Figure 4:
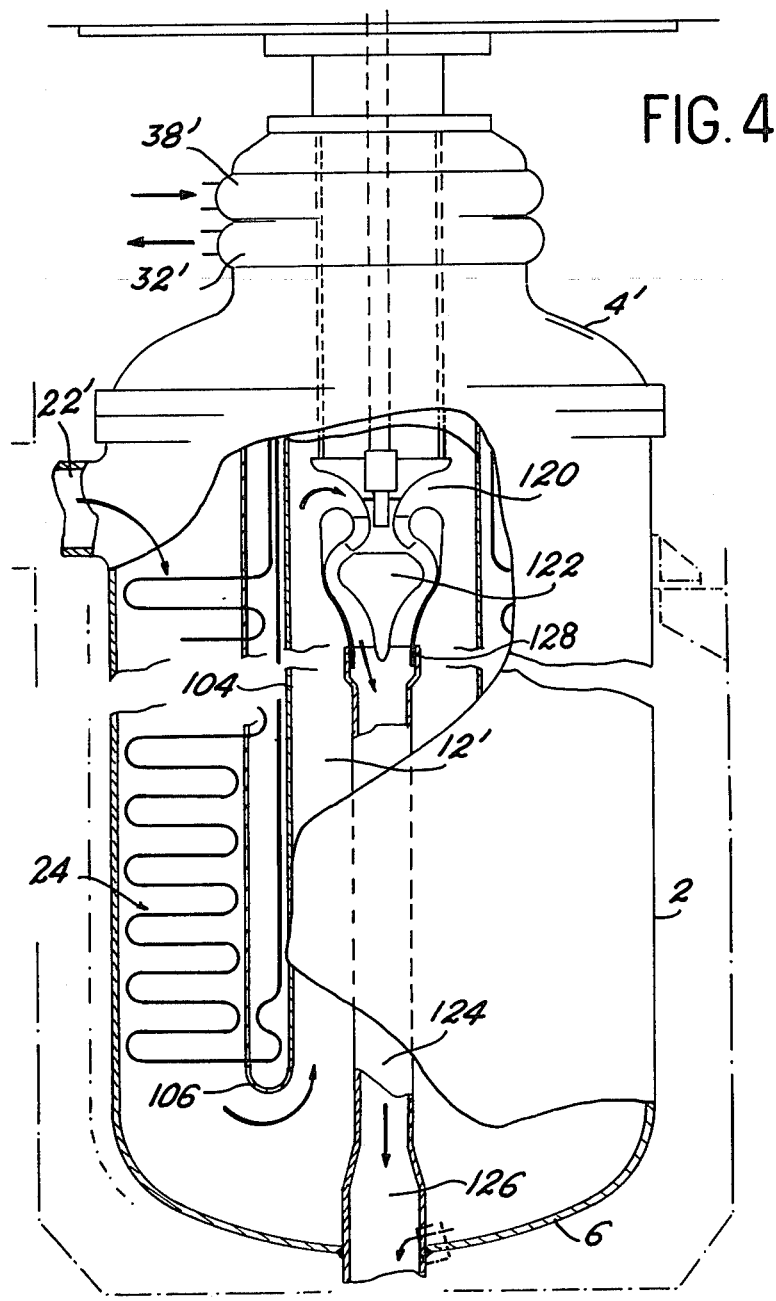
FIG. 4 shows a partial vertical section through a third embodiment of the pump/exchanger assembly with convoluted tubes, wherein the pump forces the sodium into pipes which are coaxial with the central channel.

FIG. 4 shows a third embodiment of the steam generator which obviates the need to cut the main piping for the sodium in order to take out the bundles of exchange tubes.

In this embodiment, the only modification concerns the circulation of the sodium in the axial channel and the form of the pump. In this embodiment, the inlet to the pump is constituted by a convergent 120 arranged above the rotor 122 of the pump which has a vertical axis. The outlet of the pump arranged below the rotor 122 is connected, by a sliding joint 128, to outlet piping 124 for the sodium, arranged along the axis of the axial passage 12'. In view of the arrangement of the high pressure area in the pump, the only possible seepage occurs at the sliding joint 128 and is directly sucked in again by the pump without any special device for reintroducing seepage. This piping is extended and passes through the base 6 of the outer casing, this outlet 126 constituting the sodium outlet from the exchanger and comprising the emptying device (not shown).

Of course, the same helium circuit for detecting leaks is found in all three embodiments.

In the three embodiments described, an important advantage consists in the fact that, as the part of the pump which can be dismantled revolves about its vertical axis, there is no need for careful gauging or positioning when it is assembled or dismantled, and this is of considerable value in cases where these operations are carried out from a distance under a controlled atmosphere.

I claim:

1. Pump/heat exchanger assembly having tubes with double walls, inner and outer respectively, the outer wall being provided with inner longitudinal grooves, the said exchange occuring between a primary fluid circulating outside said tubes and a secondary fluid circulating inside said tubes, said assembly comprising:

an outer cylindrical casing with a vertical axis, provided with a base, a lid and an inlet nozzle for the primary fluid arranged below said lid;

an inner cylindrical collar inside said casing and coaxial therewith and integral at its upper end with said lid, said collar defining internally a central vertical channel and externally an annular space between said casing and said collar, said collar defining between itself and the base a passage which communicates between said central channel and said annular space;

a plurality of said double-walled tubes arranged in said annular space, each of said tubes consisting of a plurality of inter-connected tube sections, said tube sections being in the form of convolutions having horizontal curved portions and elbowed portions, said tube sections being joined together at said elbowed portions.

at least one leakproof annular chamber exterior to said annular space:

a pump fixed to said lid and fitted with a rotor, said pump being located at the upper end of said central channel and adapted to draw in said primary fluid;

means for detecting leaks in said tubes comprising means for injecting an inert gas, under a given pressure, into at least one of said annular chambers, and means for comparing the pressure of said gas in at least one of said chamber with a maximum and a minimum pressure;

said tube sections being connected in said at least one chamber, the end of the outer wall of one section and the start of the outer wall of the next section opening into said chamber, and the end of the inner wall of one tube section being connected to the start of the inner wall of the next section, in leakproof manner, by an elbowed duct.

2. Pump/exchanger assembly according to claim 1, wherein each exchange tube comprises n tube sections, the pump/exchanger assembly comprises n+1 annular chambers outside said casing, constituting an upper annular outlet chamber for said secondary fluid, a lower annular inlet chamber for said secondary fluid, and n−1 intermediate annular chambers for the connecting of said tube sections, and wherein said inlet nozzle for said primary fluid is located above said upper annular chamber.

3. Pump/exchanger assembly according to claim 2, wherein one of said walls of said intermediate annular chamber is formed by a portion of said outer casing to which it is joined, and the starting and terminating ends of said inner wall of said tube sections being welded to said portion of said outer casing.

4. Pump/exchanger assembly according to claim 3, wherein one of the walls of said upper annular chamber and said lower annular chamber are formed by said portion of said outer casing to which it is joined and another of these walls constituting a tube plate of a collector for said secondary fluid, and wherein the starting and also terminating end of said outer wall of a tube is fixed, in leakproof manner, to said portion of said outer casing, and wherein the outer wall of the starting and also terminating end of a tube is fixed, in leakproof manner, to said wall constituting a tube plate.

5. Pump/exchanger assembly according to claim 1, wherein said inner collar comprises two coaxial walls connected to each other at their lower end and fixed to said lid at their upper end and defining a leakproof space, said space constituting a single annular chamber, the inner walls of said tube sections being connected in leakproof manner to the wall of said collar facing the annular passage, the end of the inner wall of one tube section being connected, by an elbowed tube, to the start of the inner wall of the next tube section, said elbowed tubes being located inside said leakproof space.

6. Pump/exchanger assembly according to claim 5, wherein the starting and terminating ends of the inner wall of a tube are each connected to a conduit, said conduits being arranged in said annular chamber, the free end of said conduits being fixed, in leakproof manner, in a tube plate of an inlet and outlet collector, respectively, for said secondary fluid, said tube plates constituting part of said lid.

7. Pump/exchanger assembly according to claim 4, wherein said central channel is extended beyond said rotor of said pump by a conduit passing through said lid and connected to an outlet nozzle for said primary fluid.

8. Pump/exchanger assembly according to claim 6, wherein said central channel is blocked off by said lid and wherein said outlet of said pump is connected to an outlet conduit for said primary fluid which is coaxial with said central channel, said conduit passing through said base in leakproof manner.

9. Pump/exchanger assembly according to claim 1, wherein said pump comprises a pump body extending into said central channel and fixed at its lower end to the upper end of said exchanger, and a skirt arranged inside said axial channel and surrounding said rotor of said pump, said pump body also comprising outlet tubing for said primary fluid, said pump body having a horizontal plate mounted in semi-tight manner in said body above said outlet tubing, said plate being supported by a perforated collar fixed at its upper end to said pump body, said skirt being provided at its upper end with a flange mounted in semi-tight manner relative to said pump body where fixed to said casing, said flange being supported by said plate by means of hollow vertical tie rods fixed to said plate and to said flange, said tie rods opening into said body above said plate and into said axial channel below said flange.

10. Pump/exchanger assembly according to claim 9, wherein said pump body is closed at its upper end by a lid, and wherein below said lid, said body includes screens for thermal and radiological protection and wherein said body comprises, immediately below said screens, inlet tubing for said inert gas.

11. Pump/exchanger assembly according to claim 1, wherein said detection means comprise means for injecting an inert gas into at least one of said annular chambers, under a given pressure situated between the pressure of said primary fluid and the pressure of said secondary fluid, means for comparing the actual pressure prevailing in said at least one annular chamber with a first maximum value and a minimum value and for triggering an alarm when said actual pressure is outside said maximum and minimum values, and means for opening the circuit of inert gas if the actual pressure exceeds a second maximum value which is greater than the first maximum value.

12. Pump/exchanger assembly according to claim 1, wherein said horizontal curved portions of said tubes are an arc of an involute of circle which is extended by an arc of circle, one extremity thereof being tangentially connected to the arc of an involute of circle, the other extremity thereof being perpendicular to said outer casing.

13. Pump/exchanger assembly according to claim 5, wherein said horizontal curved portions of said tubes are an arc of an involute of circle, the origin of which is perpendicular to said cylindrical collar.

14. Pump/exchanger assembly according to claim 5, wherein said central channel is extended beyond said rotor of said pump by a conduit passing through said lid and fitted with an outlet nozzle for said primary fluid.

15. Pump/exchanger assembly according to claim 5, wherein said pump comprises a pump body extending into said central channel and fixed at its lower end to the upper end of said exchanger, and a skirt arranged inside said axial channel and surrounding said rotor of said pump, said pump body also comprising outlet tubing for said primary fluid, said pump body having a horizontal plate mounted in semi-tight manner in said body above said outlet tubing, said plate being supported by a perforated collar fixed at its upper end a flange mounted in semi-tight manner relative to said pump body where fixed to said casing, said flange being supported by said plate by means of hollow vertical tie rods fixed to said plate and to said flange, said tie rods opening into said body above said plate and into said axial channel below said flange.

16. Pump/exchanger assembly according to claim 15, wherein said pump body is closed at its upper end by a lid, wherein below said lid, said body includes screens for thermal and radiological protection and wherein said body comprises, immediately below said screens, inlet tubing for said inert gas.

17. Pump/exchanger assembly according to claim 5, wherein said detection means comprise means for injecting an inert gas into at least one of said annular chambers, under a given pressure situated between the pressure of said primary fluid and the pressure of said secondary fluid, means for comparing the actual pressure prevailing in said at least one annular chamber with a first maximum value and a minimum value and for triggering an alarm when said actual pressure is outside these maximum and minimum values, and means for opening the circuit of said inert gas if the actual pressure exceeds a second maximum value which is greater than the first maximum value.

* * * * *